United States Patent [19]

Davis, Jr. et al.

[11] 4,158,770
[45] Jun. 19, 1979

[54] RADIOGRAPHIC IMAGING SYSTEM

[75] Inventors: Luther Davis, Jr., Wayland, Mass.;
Harrison H. Barrett, Tucson, Ariz.

[73] Assignee: Raytheon Company, Lexington, Mass.

[21] Appl. No.: 866,892

[22] Filed: Jan. 3, 1978

[51] Int. Cl.$^2$ ............................................. G03B 41/16
[52] U.S. Cl. .................................... 250/272; 250/273; 250/320; 250/358 R
[58] Field of Search ............... 250/320, 321, 322, 323, 250/272, 273, 274, 275, 358 R

[56] References Cited

U.S. PATENT DOCUMENTS

| | | | |
|---|---|---|---|
| 3,748,470 | 7/1973 | Barrett | 250/320 |
| 3,801,785 | 4/1974 | Barrett | 250/320 |

*Primary Examiner*—Craig E. Church
*Attorney, Agent, or Firm*—David M. Warren; Joseph D. Pannone; Milton D. Bartlett

[57] ABSTRACT

A system for imaging a subject, such as a human being, in which there has been injected a contrast agent which absorbs radiation of a predetermined frequency. The system utilizes a source of high energy radiation such as X or gamma radiation. The source is a composite of first and second radiating materials each of which is arranged in a predetermined pattern or code, each pattern having both luminous and dark regions. In one embodiment, the luminous regions of one pattern are in registration with the dark regions of the other pattern, these regions being spaced apart in an alternative embodiment. The characteristic frequencies of radiation emitted by the first and second materials are respectively lower and higher than the predetermined absorption frequency. A detector of radiation is positioned relative to the subject and the source such that radiation propagating through the subject is incident upon the detector. Since the absorption edge of the contrast agent lies between the two characteristic frequencies of radiation, radiation from the second material is preferentially absorbed by the contrast agent with the result that the contrast agent appears to be illuminated by a coded source while the remainder of the subject may be regarded as illuminated essentially by a uniform uncoded source. Imaging is accomplished by a decoding of a detected coded image. Substances within the subject having other absorption frequencies are not imaged since the radiations of both materials are essentially equally absorbed by the subject so that the source appears uncoded.

12 Claims, 8 Drawing Figures

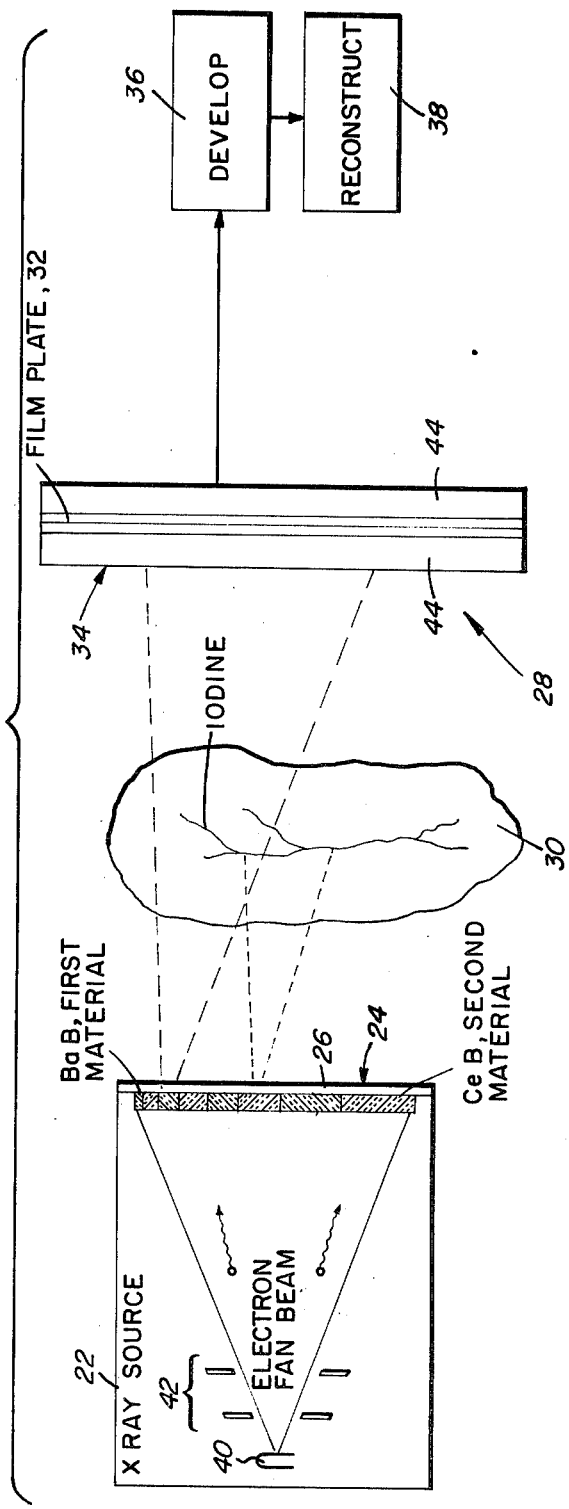
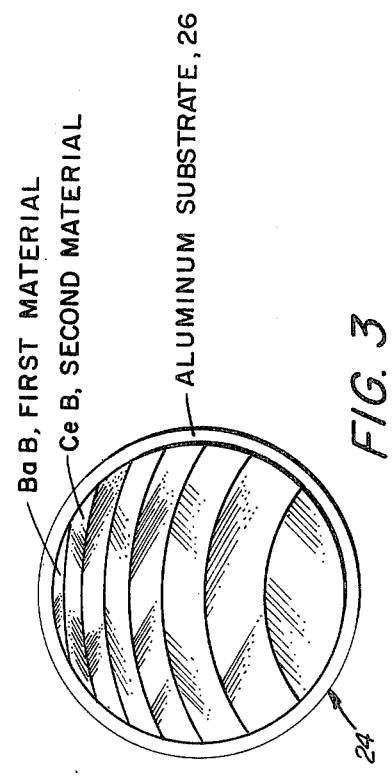
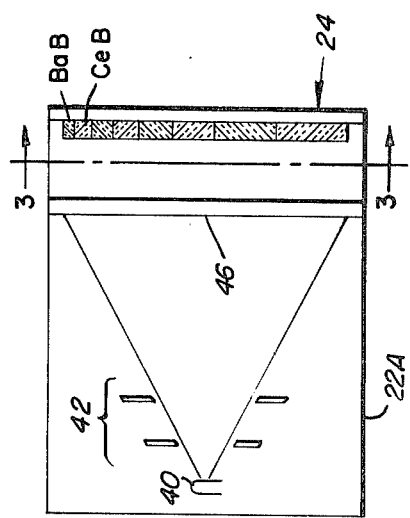

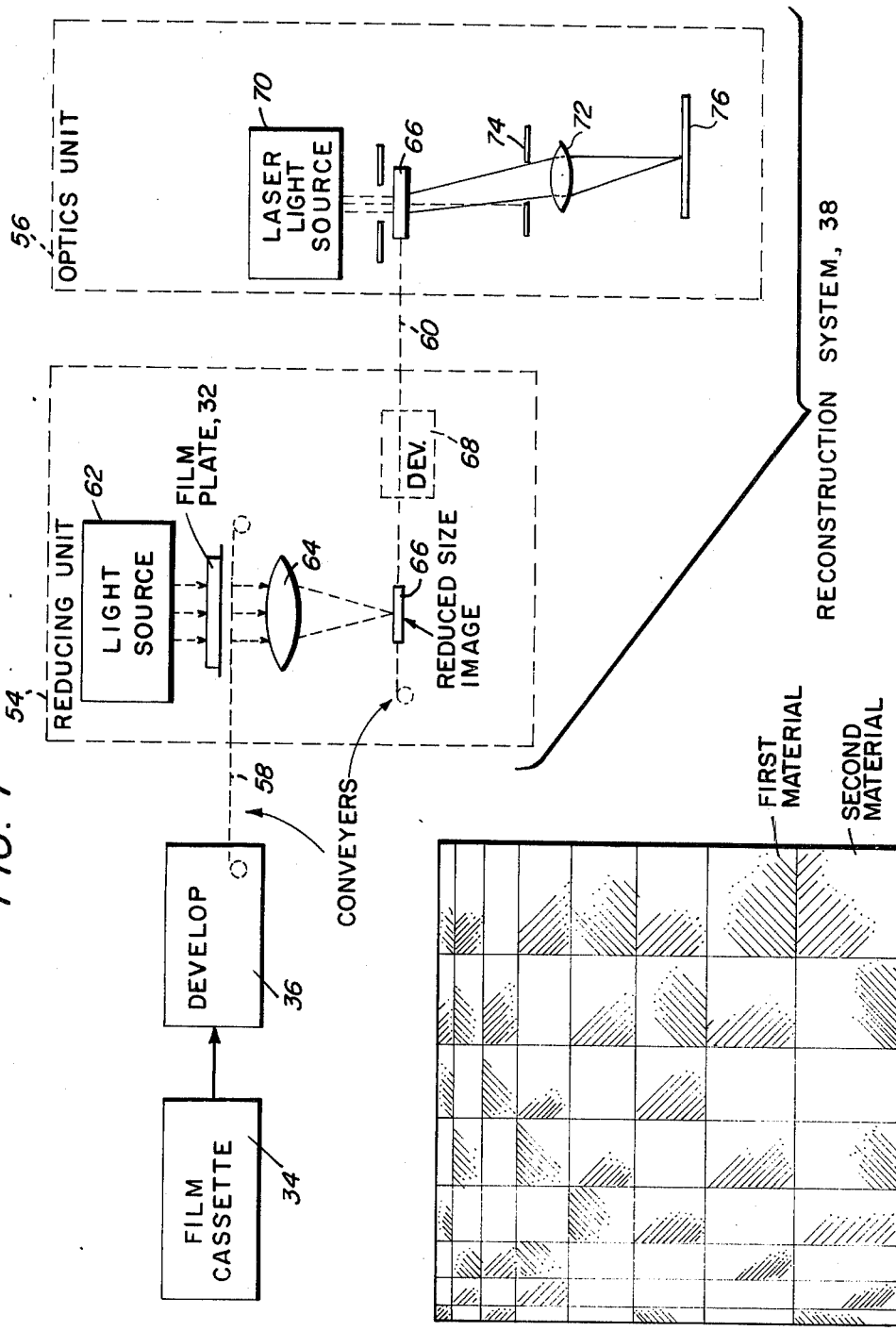

RADIOGRAPHIC IMAGING SYSTEM

BACKGROUND OF THE INVENTION

This invention relates to radiographic imaging techniques in which an extended source of spatially coded X or gamma radiation is utilized for illuminating a subject to produce a coded image thereof with an image of the subject being obtained by a decoding of the coded image.

Radiographic imaging utilizing coded sources is taught in the U.S. Pat. No. 3,748,470 which issued on July 24, 1973 in the name of H. H. Barrett wherein it is shown that imaging of a subject can be obtained by a coded source in combination with a mask that produces spatial coding of the X or gamma radiation whether the masking be done at a distance from the source or directly on the source itself so that, in the latter case, the source distribution of radioactive substances is itself a spatially modulated pattern of radiation. Therein, Barrett discloses a chirped checkerboard pattern with two dimensional matched filtering being utilized for decoding the detected coded or scrambled image to produce a true representation of the subject. The use of a Fresnel pattern in lieu of the chirped checkerboard is taught in U.S. Pat. No. 3,936,639 which issued Feb. 6, 1976 in the name of H. H. Barrett with optical reconstruction being utilized to form the desired image of the subject. With respect to the Fresnel pattern, it is noted that an on-axis pattern or, preferably, an off-axis Fresnel pattern may be utilized. In the case of the off-axis Fresnel pattern, reduction of noise is attained in the resulting image with the reconstruction process utilizing viewing optics angled with reference to a normal of a transparency of the coded or scrambled image. These reconstruction procedures are applicable, in view of the aforementioned teaching of Barrett in U.S. Pat. No. 3,748,470, whether the coding be accomplished by a mask interposed between the subject and the detector or by a spatial coding on the source itself since the coded image has the same form in either case.

A problem arises in that the small thickness of blood vessels being imaged results in absorption of radiation much less than that absorbed by the total thickness of the body. This detracts from the desired image when, as in angiography, it is desired to produce an image only of a specific element, typically the iodine of the contrast agent which is injected into the blood vessels of the subject to be imaged.

SUMMARY OF THE INVENTION

The aforementioned problem is overcome and other advantages are provided by a radiographic system for imaging a subject having a contrast agent which absorbs radiation at and slightly above a predetermined frequency generally referred to as the absorption edge. The system utilizes a source of high energy radiation from the class of radiation consisting of X and gamma radiation, the source being composed of first and second materials emitting radiation respectively at first and second characteristic frequencies of which the first frequency is lower than the aforementioned absorption edge and the second frequency is higher than the absorption edge. While both the radiations at the first and the second frequencies are attenuated by the subject, typically a human being, the radiation at the second frequency is attenuated more because of its absorption by a substance, typically the iodine of a contrast agent which is injected into the subject.

The first material is arranged in a pattern of luminous regions from which radiation is emitted and dark regions wherein there is an absence of the material and its radiation. In one embodiment of this invention, the second material is arranged in a similar pattern of luminous and dark regions with the luminous regions of the second pattern being in registration with the dark regions of the first pattern.

In an alternative embodiment, the luminous regions of one pattern are spaced apart from the luminous regions of the second pattern resulting in a pattern of dark regions for imaging also regions of the subject which do not contain the contrast agent. A detector of the radiation is positioned away from the source of radiation with the subject being located between the source and the detector. The detector extends in directions normal to the path of radiation propagating through the subject for intercepting quanta of radiation incident in the plane of the face of the detector. A coded or scrambled image of the form described in the aforementioned patents is produced upon the surface of the detector facing the subject. Reconstruction by matched filtering as disclosed in the Barrett U.S. Pat. No. 3,748,470, or by convolution as disclosed in the U.S. Pat. No. 3,263,079 which issued on July 26, 1966 in the name of L. N. Mertz and N. O. Young or by optical reconstruction as disclosed in the Barrett U.S. Pat. No. 3,936,639 is then employed to produce a true image of the subject. The resultant image is due primarily to the absorption edge of the contrast agent with essentially no contributions from absorption spectral regions of other substances normally present in the subject. Thereby, a higher contrast radiographic image of the absorbing substance, such as the aforementioned iodine, is obtained.

The invention is particularly advantageous with human subjects being examined by means of an angiogram. With the use of an iodine contrast agent the first and second materials of the source preferrably contain barium and cerium, respectively. As a result of the differential absorption by the iodine of the barium and cerium radiations, and the higher contrast image thereby produced, a significantly lower dosage of iodine may be administered to the subject than has heretofore been predicted. Consequently, the subject experiences less trauma, and the danger of death (which has occurred in a small percentage of angiogram procedures) is significantly reduced.

BRIEF DESCRIPTION OF THE DRAWINGS

The aforementioned aspects and other features of the invention are presented in the following description taken in connection with the accompanying drawings wherein:

FIG. 1 shows a radiographic system of the invention disclosing a composite source composed of two radiating materials in accordance with the invention, the film development and reconstruction of the image being shown in block diagrammatic form;

FIG. 2 is an alternative embodiment of the radiation source of FIG. 1;

FIG. 3 is a plan view of the coded radiating materials of FIGS. 1 and 2, the plan view showing an off-axis Fresnel pattern of the source taken along the line 3—3 of FIG. 2;

FIG. 4 is an alternative pattern in the form of a chirped checkerboard pattern to be used in constructing an alternative embodiment of the composite sources of FIGS. 1 and 2;

FIG. 7 is a diagrammatic view of an optical form of the reconstruction system of FIG. 1 for use with the Fresnel coded source.

DESCRIPTION OF THE PREFERRED EMBODIMENT

Figure 5:
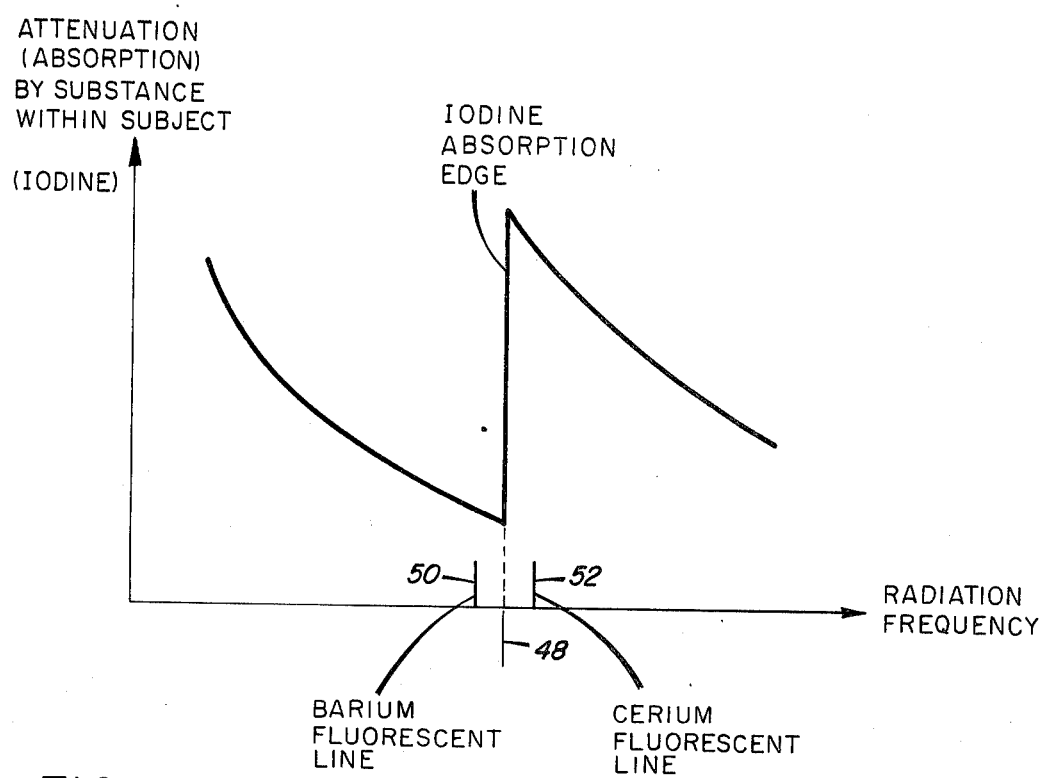
FIG. 5 is a graph of a typical absorption spectrum for a substance internally, such as the iodine of the contrast agents to be injected into the subject of FIG. 1.

Referring now to FIG. 1, there is seen a radiographic system 20 incorporating a source 22 which, in accordance with the invention, comprises a plate 24 having material thereon which emits X or gamma rays, two such materials having differing characteristic frequencies of radiation being utilized. In one embodiment of the invention, the first and second materials are arranged in first and second Fresnel patterns deposited on a substrate 26 of the plate 24. A detector 28 of the radiation faces the source 22 and a subject 30 is positioned between the source 22 and the detector 28. The detector 28 comprises a photographic film plate 32 supported within a cassette 34 for receiving a coded image of the subject 30, the film being developed in a developing unit 36 with the coded image of the film plate 32 then being decoded by a reconstruction system 38 which produces a true image of the subject 30.

The source 22 comprises a cathode 40 for emitting a fan beam of electrons, the fan beam being formed with the aid of electrodes 42. The plate 24 serves as a target with the electrode 42 directing the fan beam toward the target. Assuming that the subject 30 has been injected with a contrast agent containing iodine, the first material of the source 22 contains barium which has a characteristic frequency slightly lower than the absorption edge of the iodine. The second material of the source 22 contains cerium which has a characteristic frequency slightly above the absorption edge of the iodine. Since the first and second materials are serving as the target of the source 22 with electrons impinging directly upon the first and second materials, the barium is provided in form of barium boride and the cerium is provided in form of cerium boride in order to withstand the bombardment of the electrons. The radiation from the first material propagates through the subject 30 with substantially less attenuation than does the radiation of the second material which is absorbed more by the iodine than the radiation of the first material. The cassette 34 comprises an image intensifying screen 44 of calcium tungstate positioned before and behind the film plate 32 for illuminating the film plate 32 by scintillations induced by the incident of radiation.

Referring now to FIG. 2, an alternative embodiment of the source 22 of FIG. 1 is shown, the source of FIG. 2 being identified by the legend 22A. The source 22A differs from the source 22 in that a tungsten target 46 is positioned between the cathode 40 and the plate 24 for intercepting the electrons of the electron beam. The radiation produced by the target 46 in response to the impinging electrons is of a higher energy than the radiation of the characteristic frequencies of the first and second materials and, accordingly, induces a radiation at the characteristic frequency from the first and second materials. With the source 22A, a greater percentage of the emitted radiation is at the characteristic frequencies than with the radiation of the source 22. The two sources 22 and 22A function in substantially the same manner, as is demonstrated in FIG. 1, and provide the radiation at the lower characteristic frequency, indicated by dashed lines, which propagates through the subject 30 while the radiation at the higher characteristic frequency, indicated by the dotted lines, is attenuated by the iodine within the subject 30.

Referring now to FIGS. 1, 2 and 3, the first and second materials are seen to be arranged respectively in first and second Fresnel patterns. The first material produces the luminous portions of the first Fresnel pattern with the arcuate spaces between the regions of the first material, corresponding to the dark portions of the first pattern, being filled with the second material to form the second Fresnel pattern. Thus, the luminous portions of one pattern are in registration with the dark portion of the other pattern to produce a source which is luminous throughout, the radiation being produced is characteristic of the first and second materials at their respective positions on the plates 24. The substrate 26, is fabricated of a material such as aluminum having a low atomic number for propagation of the radiation of the first and second materials therethrough with little attenuation.

Referring now to FIG. 4, an alternative embodiment of the plate 24, this embodiment identified by the legend 24A, is seen to have a chirped checkerboard pattern wherein the first material is shown in rectangular regions alternating with rectangular regions of the second material. A similar source pattern, having but one radiation emissive material, is disclosed in the aforementioned Barrett U.S. Pat. No. 3,748,470 While the plate 24A comprises two radiation emissive materials, it is understood that, due to the selective absorption of the iodine of the subject 30 of FIG. 1, the coding of the image on the film plate 32 appears to be due essentially only to one of the materials since essentially only the characteristic radiation from that one material, the first material reaches the cassette 34. Accordingly, the decoding procedure taught by the Barrett patent may be employed by the reconstruction system 38, that procedure involving the scanning of the image in each dimension to produce a chirped waveform which is then decoded by a filter which is matched to the chirped waveform.

Referring now to FIG. 5, there is shown an exemplary graph of the absorption of radiation by the iodine of the contrast agent in the subject 30, the vertical axis representing the attenuation of radiation due to the absorption while the horizontal axis represents the frequency of the radiation. The line 48 in the Figure is designated as the absorption edge while the lines 50 and 52 represent the characteristic frequencies of fluorescent radiation emitted respectively by the barium of the first material and the cerium of the second material of the source 22 of FIG. 1. With reference to the graph of FIG. 5, and with reference to the source 22 of FIG. 1, it is seen that radiation emitted by the first material has an energy level lower than that required to excite the absorption edge of the iodine while the radiation emitted by the second material is of a higher energy than that of the absorption edge at the line 48. Accordingly, the photons emitted by the second material are sufficiently energetic to interact with the iodine to be more strongly absorbed resulting in greater attenuation of the radiation from the second material than the attenuation of radiation from the first material. Accordingly, as noted hereinabove, as viewed by the detector 28, the subject 30 appears to be more strongly illuminated by the radiation from the first material of the source 22, this giving the appearance of a source having luminous regions in the format of the Fresnel pattern.

In the event that some substance within the subject 30 has an absorption edge lower than the frequency of the line 50 of FIG. 5, then both the radiations of the first and second materials would be almost equally attenuated with the result that the subject 30 would appear to be illuminated by essentially an uncoded uniformly luminous source. Thus, there would be essentially no encoding of the radiations and, consequently, the reconstruction system 38 would produce no more than a weak image of the subject 30. Similarly, in the event that the substance within the subject 30 has an absorption edge which is of a greater frequency than that represented by the line 52, there would be essentially no interaction with that substance to produce an absorption and attenuation of the radiation emitted by the source 22 so that, again, the detector 28 would appear to be illuminated by an uncoded or uniform source. Thus, the reconstruction system 38 would again produce no more than a weak image of the subject 30. In this way, the system 20 is able to substantially eliminate the effect of substances other than the one having the absorption edge designated by the line 48 from the reconstructed image produced by the reconstruction system 38. Accordingly, the image appearing on the viewing screen 76 has a greater sensitivity to the outline of the iodine in the contrast agent within the subject 30.

Figure 6:
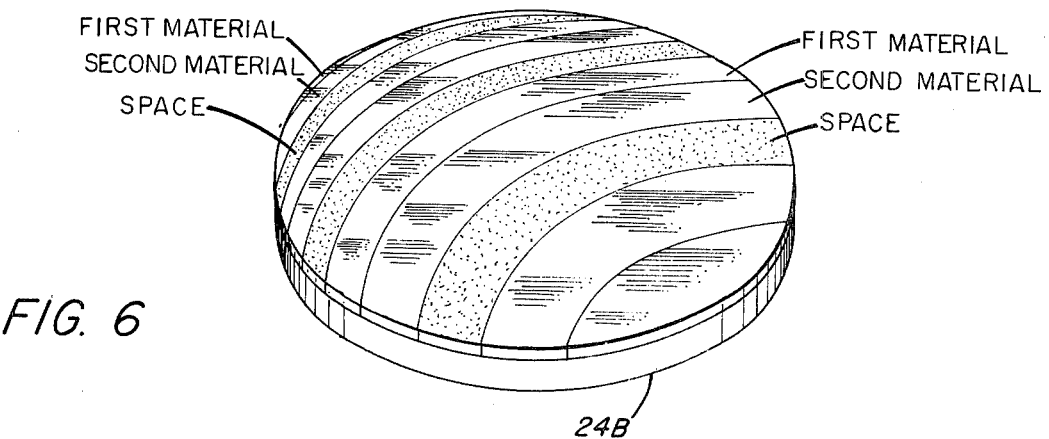
FIG. 6 shows an alternative embodiment of the coded sources of FIGS. 1 and 2 having a space region between a pair of radiation emissive regions.

Referring now to FIG. 6, there is seen an alternative embodiment of the plates 24 of FIG. 1, this plate being identified by the legend 24B. The embodiment of FIG. 6 has a format composed of three sets of arcuate patterns. Each set of arcuate patterns is an approximation to a Fresnel pattern wherein adjacent luminous regions of the first and second materials are narrower to accommodate a non-luminous space region. Thus, for subjects having substances with radiation absorption edges below the line 50 or above the line 52, in which case there appears substantially equal absorption at both radiation frequencies, the non-luminous regions of the arcuate spaces of the plate 24B present a source format similar to that of a Fresnel pattern to provide for imaging of the subject.

By way of alternative embodiment of the source 22 of FIG. 1, it is noted that the source may be composed of radioactive materials in lieu of the use of a source containing an electron beam. In a source containing radioactive material, the material may be arranged in formats such as those disclosed for the first and second materials of the plates 24, 24A and 24B in which case the first material would comprise a radioactive material rather then the previously disclosed barium and the second material would be composed of a second radioactive material rather then the previously disclosed cerium. The radioactive materials would, in the case of the Fresnel pattern, be deposited in alternate arcuate strips upon a substrate such as the aluminum substrate 26, the first and second radioactive materials being deposited on the same side or on opposite sides of the substrate 26 and may be encapsulated by a material such as silicon dioxide (not shown) to hermetically seal the source.

Referring now to FIG. 7, the reconstruction system 38 is seen to comprise a reducing unit 54 and an optics unit 56 to provide for an optical reconstruction of the coded image on the film plate 32 of FIG. 1 for the case wherein the source 22 has a Fresnel pattern. The use of such optical reconstruction is taught in patents of the prior art such as the aforementioned Barrett U.S. Pat. No. 3,936,639. In accordance with procedures presently practiced in hospitals, the film plate is first developed, then positioned within a photographic reducing unit which reduces the size of the original image, an 11 inch by 14 inch X-ray plate, to a much smaller image on the order of ¼ inch in size for reconstruction by a laser emitting light in the visible spectrum. A film plate containing the reduced size image is then positioned in front of a laser light source to be viewed at an angle from the normal in the case of an off-axis Fresnel pattern, for viewing the true image of the subject. The reduced size image provides that the zone plate fringes in the image of a point source be at spacings commensurate with the wavelength of the laser light to permit a focussed effect in the reconstruction.

By way of demonstration of an automated system for developing and reconstructing the system 20 of FIG. 1, FIG. 7 shows conveyors 58 and 60 which convey a film plate from a developer 36 to the reducing unit 54 and from the reducing unit 54 to the optics unit 56, respectively. The reducing unit 54 comprises a light source 62 and a lens 64, the conveyor 58 supporting the film plate 32 between the light source 62 and the lens 64 so that parallel rays of light propagate from the source 62 through the film plate 32 to be focussed by the lens 64 into a reduced size image upon a film plate 66. The film plate 66 is then conveyed through a developing unit 68 by the conveyor 60 for developing the reduced size image whereupon the film plate 66 is further conveyed into the optics unit 56.

The optics unit 56 comprises a laser light source 70 which includes a laser producing a relatively narrow beam of light, and beam expansion optics for enlarging the beam to illuminate the entire coded image upon film plate 66. For example, the expansion optics at the source 70 (not shown) may comprise a concave lens for expanding the rays of light followed by a convex lens for producing parallel rays of light. The illuminated film plate 66 is viewed by a lens 72 through a stop 74 for projecting a true image of the subject 30 upon a viewing screen 76. The stop 74 stops light projected normally from the film plate 66 and permits observation at a slight angle to the normal of the film plate 66 for extracting an image in accordance with an off-axis Fresnel pattern.

Figure 8:
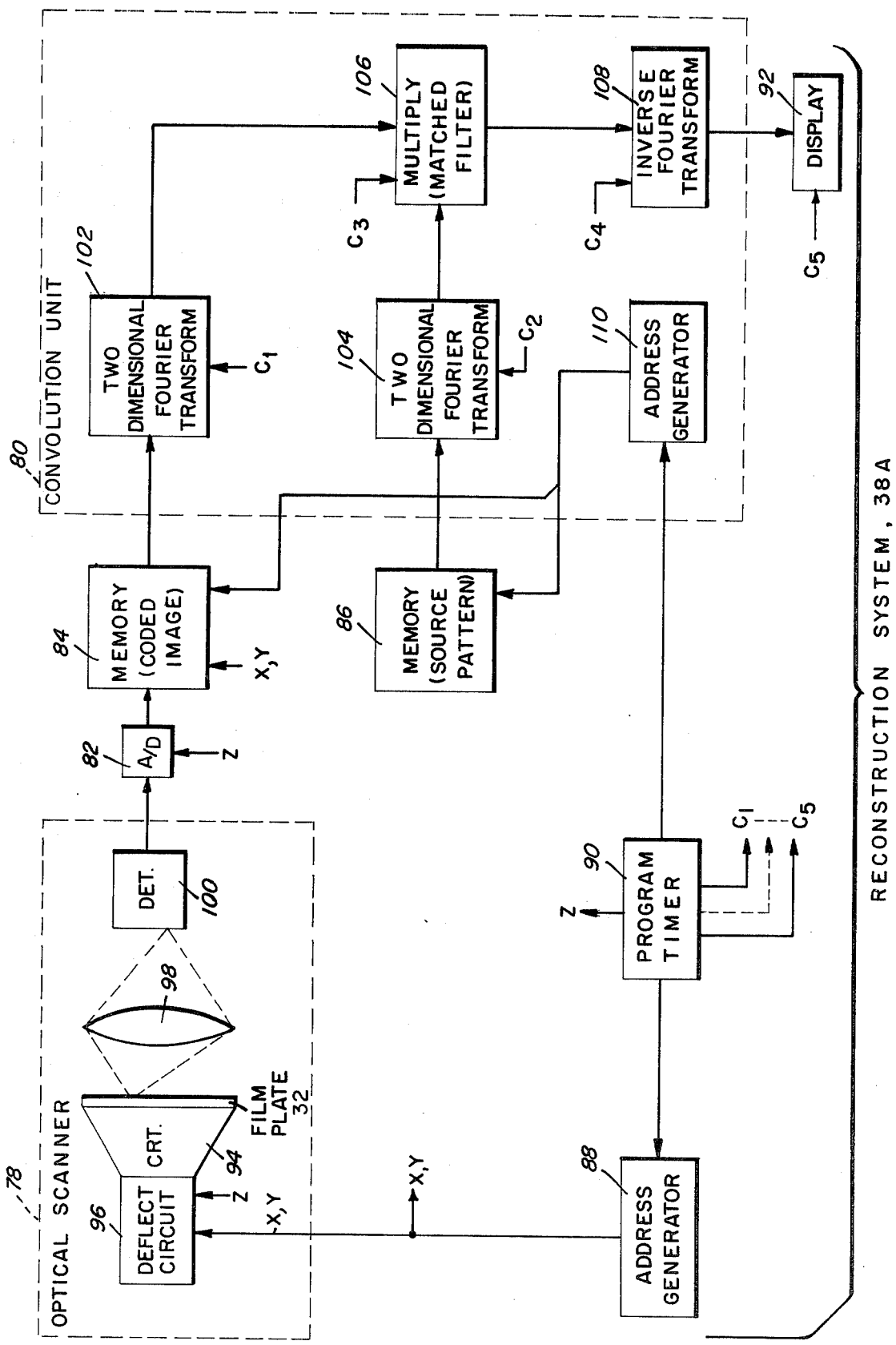
FIG. 8 shows a diagram of an alternative embodiment of the reconstruction system of FIG. 1 utilizing an optical scanner and computer reconstruction for a coded source such as the coded source of FIG. 4.

Referring now to FIG. 8, there is seen an alternative embodiment of the reconstruction system 38 of FIGS. 1 and 7, the embodiment of FIG. 8 being identified by the legends 38A. The film plate 32 of FIG. 1 may be conveyed either manually or automatically by a conveyor such as the conveyor 58 of FIG. 7 from the developing unit 36 to the reconstruction system 38A, the conveyor being omitted from FIG. 8 in the interest of clarity. The system 38A comprises an optical scanner 78, a convolution unit 80, an analog-to-digital converter 82, two memories 84 and 86, an address generator 88 and a program timer 90. The scanner 78 scans the film plate 32 and produces a series of analog signals corresponding to each of a series of regions viewed serially by the scanner 78. Each region is addressed by an X and Y coordinate address provided by the generator 88. The generator 88 is driven by the timer 90 which also produces a Z axis signal which triggers the scanner 78 to view the next region of the film plate 32. In response to the Z axis signal, the converter 82 converts each successive analog signal to a digital signal which is stored in the memory 84 in response to the X and Y address signal from the generator 88. Thus, at the completion of the scanning of the film plate 32, the memory 84 contains stored values of each of the regions, or picture elements, of the coded image of the film plate 32.

The memory 86 is provided with the stored set of digital signals representing the amplitudes of the luminosity of the elemental regions of the first Fresnel pattern of the first material of the plate 24 of FIG. 3, or the pattern of the first material of the plate 24A of FIG. 4, or the pattern of the first material of the plate 24B of FIG. 6 or such other format as may be desired to be utilized for the source 22. The convolution unit 80, in response to timing signals provided by the program timer 90, convolves the data of the memory 84 with the data of the memory 86 to produce a set of points for the display of the display 92, the series of points representing the outline of the contrast agent within the subject 30 of FIG. 1.

The optical scanner 78 comprises a CRT (cathode ray tube) 94 driven by a deflection circuit 96, a lens 98 and an optical detector 100. The film plate 32 is positioned along the face of the CRT 94, the CRT 94 having a phosphor along its face which emits light in response to impinging electrons of the electron beam of the CRT 94. The electron beam is positioned in accordance with the X and Y address signals applied by the generator 88 to the reflection circuit 96 for illuminating successive elemental regions of the film plate 32 corresponding to the X and Y address. The light emitted by the phosphor passes through the film plate 32 and is gathered by the lens 98 to be directed toward the detector 100. The light produced by the phosphor is in the form of a small spot of light and is scanned along the film plate 32 in response to a scanning of the electron beam of the CRT 94. The scanning is accomplished step wise in accordance with each change in the X and Y address. The Z axis signal provided by the timer 90 gates on the electron beam for each of the successive positions of the beam. Accordingly, the successive values of the analog signal produced by the detector 100 appear in synchronism with the occurrence of the Z axis signal of the timer 90.

The convolution unit 80 comprises Fourier transformers 102 and 104 each of which produces a two dimensional digital Fourier transformation, a multiplier 106 for sequentially multiplying pairs of factors in the manner of a matched filter, an inverse Fourier transformer 108 and an address generator 110. The operation of the convolution unit 80 is similar to the digital reconstruction system disclosed in the United States patent application having Ser. No. 704,138 entitled Multiple Masking Imaging System and having a filing date of July 12, 1976 by Roger Tancrell et al. Convolution in the time domain is accomplished by the multiplication in the frequency domain. Accordingly, the convolution unit 80 operates by a process of first computing the two dimensional Fourier transforms of the data of the memory 84 and the reference data of the source pattern in the memory 86, these transformations then being multiplied together point by point, the multiplication then being followed by an inverse Fourier transformation to produce the true image. The operation of the Fourier transformers 102 and 104, of the multiplier 106 and of the inverse Fourier transformer 108 are synchronized by timing signals C1–C4 from the timer 90 with a timing signal C5 being applied to the display 92 for synchronizing its operation with that of the convolution unit 80. The multiplier 106 multiplies pairs of factors extracted serially from the transformers 102 and 104, the factors in each pair of factors having corresponding locations in the array of spacial frequency terms produced by the transformers 102 and 104. Since no cross multiplication is utilized in the procedure of the multiplier 106, the procedure has greater simplicity than that afforded by a direct calculation of a convolution and, accordingly, convolution unit 80 is able to rapidly produce the two dimensional convolution by operating in the frequency domain as is known in the computer art. The foregoing computerized construction has the advantage that it lends itself to a large variety of coding patterns of the radiation emissive material utilized in the construction of the source 22. The program sequence of the timer 90 first provides for the entry of data into the memory 84 and, upon completion of the entry of the data into the memory 84, then provides for the energization of the generator 110 for the reading out of the data of both the memories 84 and 86 into the transformers 102 and 104. In this way, the entire operation of the optical scanning followed by the convolution is under the control of a single timer.

It is understood that the aforementioned embodiments of the invention are illustrative only and that modifications thereof may occur to those skilled in the art. Accordingly, it is desired that this invention is not to be limited by the embodiments disclosed herein but is to limited only as defined by the appended claims.

What is claimed is:

1. A radiographic system for imaging a subject having a substance which preferentially absorbs radiation at a predetermined frequency comprising:

a source of radiation from the class of radiation consisting of X and gamma radiation, such source having a first material for emitting such radiation having a frequency lower than said predetermined frequency and situated in a plurality of spaced apart locations about said source, said source having a second material for emitting such radiation having a frequency higher than said predetermined frequency and situated in a plurality of spaced apart locations corresponding to the spaces between the locations of the first material, the locations of said first material forming a first pattern, the locations of said second material forming a second pattern similar to said first pattern, said source being positioned to illuminate said subject;

a detector of said radiation, said subject being positioned between said source and said detector, said detector detecting radiation propagating through said subject, the pattern of a material of said source producing a coded representation of said subject on said detector; and means operative with said detector for decoding said representation to produce an image of said subject.

2. A system according to claim 1 wherein said patterns are Fresnel patterns and said decoding means comprises a laser for illuminating a photographic film transparency of said coded representation, an optical means for viewing an off-axis image from light of said laser propagating through said transparency.

3. A system according to claim 1 wherein said patterns are in the form of a chirped checkerboard.

4. A system according to claim 1 wherein said decoding means comprises computer means for convolving said coded representation with a reference pattern.

5. A system according to claim 1 wherein said source comprises a non-luminous region positioned between a location of said first material and a location of said second material.

6. A radiographic system for imaging a subject having a substance which absorbs radiation of a predetermined frequency from the class of radiation consisting of X and gamma radiation comprising:
   a source and a detector, said detector being spaced apart from said source and said subject being positioned between said source and said detector;
   said source comprising a first material emitting radiation at a first frequency lower than said predetermined frequency, said source comprising a second material emitting radiation having a frequency higher than said predetermined frequency, said first material being located at positions corresponding to a first pattern, said second material being located at positions alternating with said positions of said first material to produce a second pattern similar to said first pattern;
   said detector receiving an image from radiation incident thereupon, said image being coded in accordance with the pattern of said second material wherein an image of said substance is outlined by absorption of radiation from said second material by said substance, said radiation of said first material uniformly propagating through said subject with less absorption by said substance than said radiation of said second material; and
   means matched to said pattern for decoding said coded image to produce a true image of said subject.

7. A system according to claim 6 wherein said decoding means comprises viewing optics oriented off the axis of a transparency of said coded image whereby the reconstruction is matched to an off-axis Fresnel pattern of said material.

8. A system according to claim 6 wherein said decoding means comprises a filter having a phase and frequency characteristic matched to a scanning along a line of said coded image.

9. A system according to claim 6 wherein said decoding means comprises means for convolving said coded image with a reference pattern.

10. In a radiographic imaging system employing a coded source and means for reconstructing an image from a coded image, a coded source comprising:
    a first radiation emissive material positioned in predetermined locations in a predetermined pattern upon a face of said source for radiating a subject having a contrast agent therein, said constrat agnet having a predetermined absorption edge in its radiation absorption frequency spectrum, said first material having a characteristic frequency of its radiation lower than the frequency of said absorption edge; and
    said source having a second material interleaved with said first material to produce a second pattern upon said face of said source for radiating said subject, said second material having a characteristic frequency of radiation higher than the frequency of said absorption edge.

11. A system according to claim 10 wherein said source comprises a target illuminated by an electron beam, said target illuminating said first material and said second material with X-radiation, said first material and said second material producing fluorescent radiation at said characteristic frequencies in response to said illumination by said target.

12. A method of radiographic imaging comprising the steps of:
    injecting a contrast agent having a predetermined absorption edge into a subject to be imaged;
    illuminating said subject by source of spatially coded radiation having first and second characteristic frequencies to provide a coded image of said subject said first frequency being lower than said absorption edge and said second frequency being greater than said absorption edge; and
    decoding said coded image to provide a true image of said subject.

* * * * *